United States Patent
Fuegel et al.

(10) Patent No.: US 12,065,845 B2
(45) Date of Patent: Aug. 20, 2024

(54) DEVICE FOR A DISTRIBUTION MAST, DISTRIBUTION MAST HAVING A DEVICE, AND SYSTEM HAVING A DISTRIBUTION MAST

(71) Applicant: Putzmeister Engineering GmbH, Aichtal (DE)

(72) Inventors: Dietmar Fuegel, Wolfschlugen (DE); Benedikt Pawisa, Wernau (DE); Benjamin Rau, Walddorfhaeslach (DE)

(73) Assignee: Putzmeister Engineering GmbH, Aichtal (DE)

( * ) Notice: Subject to any disclaimer, the term of this patent is extended or adjusted under 35 U.S.C. 154(b) by 227 days.

(21) Appl. No.: 17/636,419

(22) PCT Filed: Aug. 20, 2020

(86) PCT No.: PCT/EP2020/073305
§ 371 (c)(1),
(2) Date: Feb. 18, 2022

(87) PCT Pub. No.: WO2021/032825
PCT Pub. Date: Feb. 25, 2021

(65) Prior Publication Data
US 2022/0282505 A1    Sep. 8, 2022

(30) Foreign Application Priority Data
Aug. 22, 2019    (DE) ..................... 10 2019 212 616.2

(51) Int. Cl.
*E04G 21/04*    (2006.01)
*F16L 27/08*    (2006.01)

(52) U.S. Cl.
CPC ...... *E04G 21/0445* (2013.01); *F16L 27/0828* (2013.01); *E04G 21/0436* (2013.01)

(58) Field of Classification Search
CPC ........... E04G 21/0445; E04G 21/0436; E04G 2021/049; F16L 27/0828; F16L 27/0824
See application file for complete search history.

(56) References Cited

U.S. PATENT DOCUMENTS 4,625,760 A * 12/1986 Mertens .............. E04G 21/0436
285/283
5,256,005 A * 10/1993 Beck, III ................ E02D 15/04
405/233

(Continued)

FOREIGN PATENT DOCUMENTS

DE    39 09 212 A1    9/1990
DE    42 33 171 A1    4/1994

(Continued)

OTHER PUBLICATIONS

International Search Report (PCT/ISA/210) issued in PCT Application No. PCT/EP2020/073305 dated Nov. 27, 2020 with English translation (four (4) pages).

(Continued)

*Primary Examiner* — Patrick C Williams
(74) *Attorney, Agent, or Firm* — Crowell & Moring LLP

(57) ABSTRACT

A device for a distribution mast includes a line and a line section mounting. The line has a mast line section and a loose rotational line section, and the rotational line section is rotatably connected to the mast line section. The line section mounting has a loose rotational holding element and a rotary bearing, and the rotational holding element keeps the rotational line section at a distance from the mast line section. The rotary bearing is designed to be supported by a mast segment for the distribution mast and for rotatably connecting the rotational holding element to the mast segment and defines a circle, the line being guided through the circle.

18 Claims, 4 Drawing Sheets

(56) References Cited

U.S. PATENT DOCUMENTS

| | | | | |
|---|---|---|---|---|
| 5,535,780 A | * | 7/1996 | Schlecht | ................ E04G 21/04 |
| | | | | 141/387 |
| 2008/0219822 A1 | * | 9/2008 | Funk | .................. E04G 21/0436 |
| | | | | 414/495 |

FOREIGN PATENT DOCUMENTS

| | | |
|---|---|---|
| DE | 10 2007 015 509 A1 | 10/2007 |
| DE | 10 2010 061 021 A1 | 5/2012 |
| DE | 10 2014 203 054 A1 | 9/2015 |
| DE | 10 2014 005 100 A1 | 10/2015 |

OTHER PUBLICATIONS

German-language Written Opinion (PCT/ISA/237) issued in PCT Application No. PCT/EP2020/073305 dated Nov. 27, 2020 (five (5) pages).

* cited by examiner

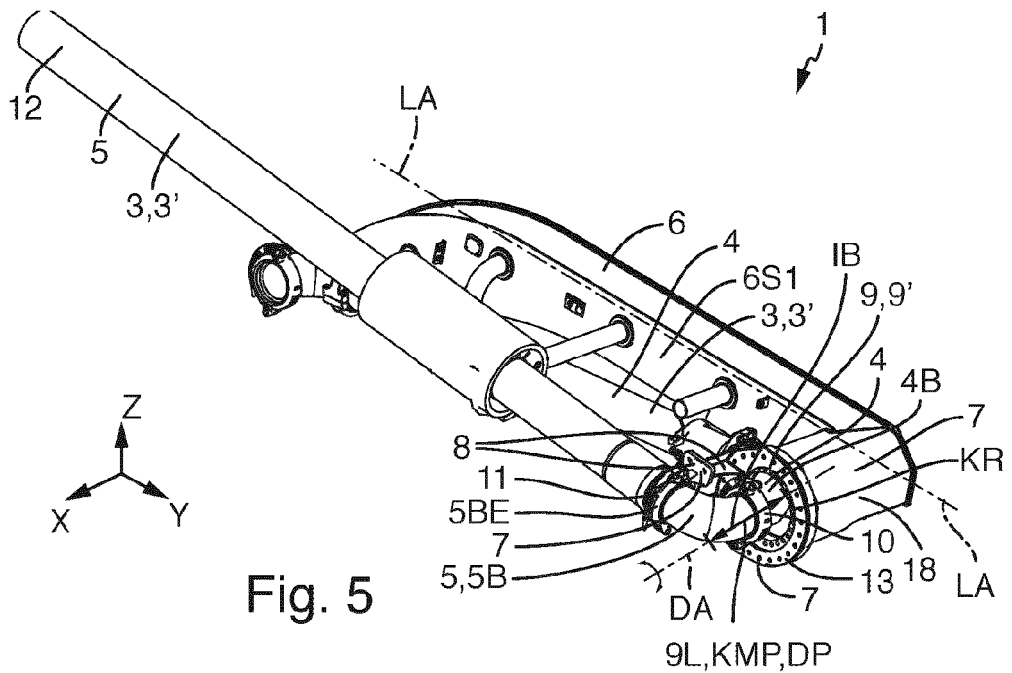
Fig. 5
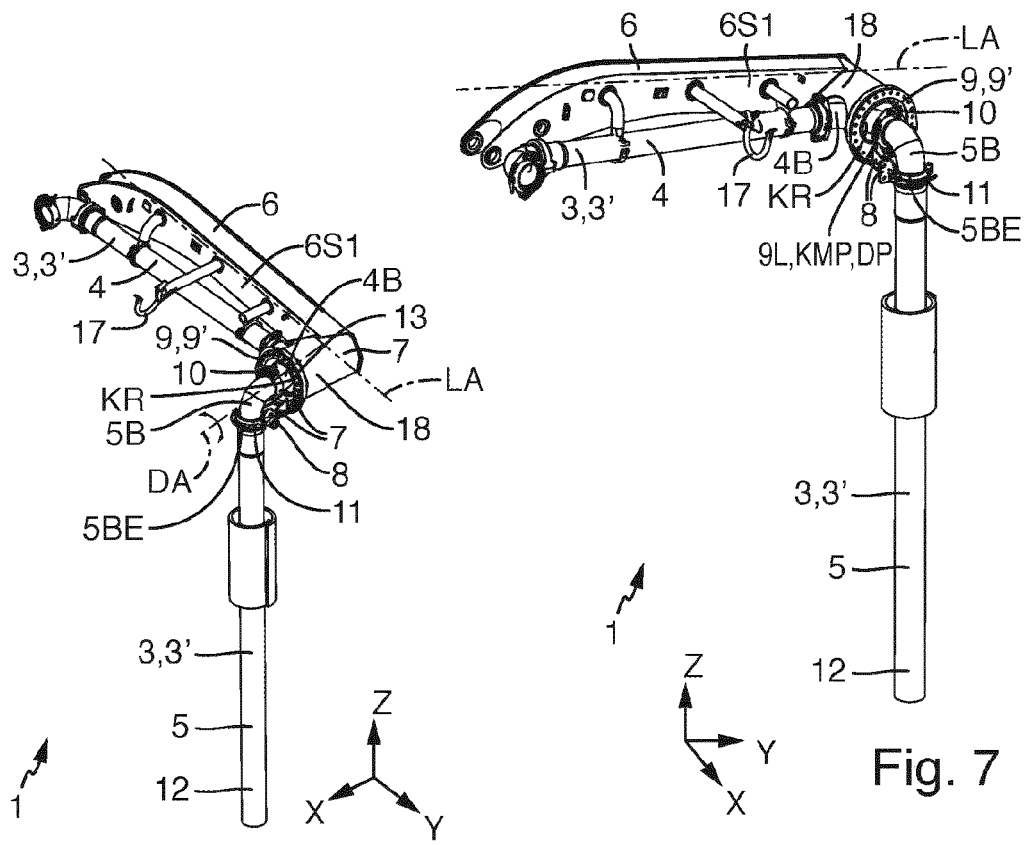
Fig.6
Fig. 7

DEVICE FOR A DISTRIBUTION MAST, DISTRIBUTION MAST HAVING A DEVICE, AND SYSTEM HAVING A DISTRIBUTION MAST

FIELD OF APPLICATION AND PRIOR ART

The invention relates to a device for a distribution mast, to a distribution mast having such a device, and to a system having such a distribution mast.

OBJECT AND ACHIEVEMENT

The invention is based on the object of providing a device for a distribution mast, wherein the device has improved properties; a distribution mast having such a device; and a system having such a distribution mast.

The invention achieves this object by providing a device, a distribution mast, and/or a system in accordance with the claimed invention. Advantageous refinements and/or design embodiments of the invention are described in the dependent claims.

The device according to the invention is suitable for a distribution mast, in particular a folding mast. The device has a line and a line portion mounting or a line portion support, respectively. The line has a mast line portion and a loose or free, respectively, rotating line portion. The rotating line portion is rotatably connected to the mast line portion. The line portion mounting has a loose or free rotating holding element or rotating support element, respectively, and a rotary bearing. The rotating holding element holds or supports, respectively, in particular in a rotationally fixed manner, the rotating line portion so as to be remote or spaced apart, respectively, from the mast line portion. The rotary bearing is designed or configured, respectively, for mounting or supporting, respectively, in particular in a rotationally fixed manner, by an in particular last mast segment, in particular a mast tip, or a boom arm for the distribution mast, respectively. Furthermore, the rotary bearing is designed or configured, respectively, for rotatably connecting the rotating holding element to the mast segment. Moreover, the rotary bearing defines or delimits, respectively, a circle. The line runs, or is routed, respectively, through the circle, in particular completely through the latter.

When the rotary bearing is mounted by the mast segment, the line portion mounting enables that the rotating line portion does not need to be held, or may not be held, in particular solely by means of the mast line portion. This thus enables that the rotating line portion can have a relatively great mass, in particular of at least 50 kilograms (kg), in particular at least 100 kg, in particular at least 200 kg, and/or at most 2000 kg, in particular at most 1000 kg, in particular 500 kg, in particular in comparison to a device not according to the invention and without a line portion mounting. Additionally or alternatively, the mast line portion does not need to, or may not, hold the rotary bearing, in particular when the rotary bearing is mounted by the mast segment.

The rotatable connection between the rotating line portion and the mast line portion and the rotatable connection between the rotating holding element and the mast segment by means of the rotary bearing enable that the rotating holding element having the rotating line portion can rotate in a vertically downward direction, in particular by virtue of gravitation.

Running the line through the circle enables that a rotation of the rotating holding element having the rotating line portion can be relatively unrestricted, in particular in comparison to not running the line through the circle in a manner not according to the invention. This thus enables a relatively high degree of flexibility, or relatively free motion sequences and/or relatively effective fields of application such as, for example, as tremie for a folding mast type 5RZ (R: rolling) and/or for folding masts in the type of folding mechanisms of which relatively large angular ranges have to be traveled.

The device thus has improved properties.

In particular, the line and the line portion mounting can differ from one another.

The line can be continuous or uninterrupted, respectively, in particular for a flow of in particular construction material, in particular thick matter. Additionally or alternatively, the mast line portion and the rotating line portion can be connected to one another for a flow of in particular construction material, in particular of thick matter. Furthermore additionally or alternatively, the mast line portion and the rotating line portion can differ from one another. Furthermore additionally or alternatively, the mast line portion can be configured for the, in particular rotationally fixed, mounting by the mast segment, and/or the line portion mounting can hold, in particular in a rotationally fixed manner, the mast line portion. Furthermore additionally or alternatively, the mast line portion can hold the rotating line portion. Furthermore additionally or alternatively, the rotating line portion, when mounted by the mast segment, can be held on the mast segment by means of the mast line portion, however in particular not directly.

The rotary holding element and the rotary bearing can differ from one another. Additionally or alternatively, the rotary bearing can hold the rotary holding element. Furthermore additionally or alternatively, the rotating holding element, when held by the mast segment, can be held on the mast segment by means of the rotary bearing, however in particular not directly. Furthermore additionally or alternatively, the rotating line portion, when held by the mast segment, can be held on the mast segment by means of the rotating holding element and the rotary bearing, however in particular not directly. Furthermore additionally or alternatively, the rotating holding element can run from the rotary bearing up to the rotating line portion.

Holding in a remote manner can mean that the rotating holding element can hold the rotating line portion so as to be remote from the rotatable connection between the rotating line portion and the mast line portion. Additionally or alternatively, the rotatable connection between the rotating line portion and the mast line portion can be configured for mounting by the mast segment and/or the line portion mounting can hold the rotatable connection.

Loose can mean that the rotating holding element having the rotating line portion can be self-aligning, in particular by virtue of gravitation. Additionally or alternatively, the rotating line portion and/or the rotating holding element do/does or may not have to be rotatably driven.

The device for disposing the rotatable connection between the rotating line portion and the mast line portion and/or the rotatable connection of the line portion mounting can be configured at an in particular loose or free, respectively, end of the mast segment.

The rotary bearing, or at least one bearing element of the rotary bearing, or a trajectory, in particular a rotary trajectory, of the rotary bearing or of the bearing element can have the shape of at least one, in particular open, arc, in particular of less than 360 degrees, wherein the arc can define the circle, or even of the, in particular closed, circle, in particular full circle, of in particular of 360 degrees. Additionally or alternatively, the line can run through the rotary bearing. In other words, the rotary bearing can encompass, in particular enclose, the line. Furthermore additionally or alternatively, the rotary bearing can have, in particular be, a radial bearing, in particular a radial axial bearing.

In a refinement of the invention, the rotating line portion is connected to the mast line portion in a continuously rotatable manner. The rotary bearing is designed or configured, respectively, for connecting the rotating holding element to the mast segment in a continuously rotatable manner. The device is designed or configured, respectively, in such a manner that, when mounting the rotary bearing, in particular, and the mast line portion by the mast segment, a continuous rotation of the rotating holding element having the rotating line portion is unrestricted by the mast segment and the mast line portion, in particular, and by the other or remaining, respectively, line portion mounting. This enables a relatively high degree of flexibility, or relatively free motion sequences and/or relatively effective fields of application. Continuously rotatable can mean rotatable by 360 degrees and more. Additionally or alternatively, the remaining line portion mounting can comprise, in particular be, the rotary bearing. Furthermore additionally or alternatively, the line portion mounting can have a mast holding element, wherein the mast holding element can be configured for mounting, in particular in a rotationally fixed manner, by the mast segment, and can hold the rotary bearing, in particular, and the mast line portion. The remaining line portion mounting can comprise, in particular be, the mast holding element.

In a refinement of the invention, the rotating line portion is connected to the mast line portion so as to be rotatable about a rotation axis. The device is designed or configured, respectively, for disposing the rotation axis so as not to be parallel, in particular so as to be orthogonal, to a longitudinal axis of the mast segment. In particular, the device for disposing the rotation axis can be configured so as to be horizontal. Additionally or alternatively, the rotating holding element can hold the rotating line portion at a location where the rotating line portion can run so as not to be parallel, in particular so as to be orthogonal, to the rotation axis.

In a refinement of the invention, the rotating line portion is connected to the mast line portion so as to be rotatable about a, in particular the, rotation axis. The rotary bearing is designed or configured, respectively, to be connected to the mast segment so as to be rotatable about the, in particular the same, rotation axis of the rotating holding element. This enables a relatively positive rotatability of the rotating holding element having the rotating line portion, and/or enables that the rotating line portion, the mast line portion and/or the rotating holding element can be inflexible, in particular in each case at least at the rotatable connection. In particular, the device for disposing the rotation axis can be configured so as to be horizontal. Additionally or alternatively, the rotating holding element can hold the rotating line portion at a location where the rotating line portion can run so as not to be parallel, in particular so as to be orthogonal, to the rotation axis. Furthermore additionally or alternatively, a plane of the circle can be orthogonal to the rotation axis.

In a refinement of the invention, the mast line portion has a mast bend. The mast bend is connected to the rotating line portion so as to be rotatable, in particular about the rotation axis. Additionally or alternatively, the mast bend is routed or runs, respectively, through the circle, in particular completely through the latter.

Furthermore additionally or alternatively, the rotating line portion has a rotating bend. The rotating bend is connected to the mast line portion, in particular the mast bend, so as to be rotatable, in particular about the rotation axis. Additionally or alternatively, the rotating bend is routed or runs, respectively, through the circle, in particular completely through the latter. Furthermore additionally or alternatively, the rotating holding element holds the rotating line portion at an end of the rotating bend that is remote, or spaced apart, respectively, from the mast line portion, in particular the mast bend.

The mast bend, when the rotation axis is disposed so as not to be parallel, in particular so as to be orthogonal, to the longitudinal axis of the mast segment, can enable that an in particular straight part of the mast line portion that precedes the mast bend can run along the mast segment, in particular so as to be parallel to the longitudinal axis.

Additionally or alternatively, the rotating bend, when the rotation axis is disposed so as not to be parallel, in particular so as to be orthogonal, to the longitudinal axis of the mast segment, can enable that an in particular straight part of the mast line portion that succeeds the rotating bend and/or an in particular straight hose that succeeds the rotating bend, can run along the mast segment, in particular so as to be parallel to the longitudinal axis.

In particular, the mast bend and/or the rotating bend can in each case be a 90 degree bend and/or a tubular bend. Additionally or alternatively, the rotating holding element can hold the rotating line portion on an end of the rotating bend that is close or adjacent, respectively, to the mast line portion, in particular to the mast bend.

In a design embodiment of the invention, the rotating bend is connected to the mast bend so as to be rotatable about a, in particular the, rotation axis. The rotating bend and the mast bend along the rotation axis delimit an internal region. A bearing point, in particular a bearing center, of the rotary bearing and/or a center of the circle are/is disposed in the internal region, in particular on the rotation axis. Additionally or alternatively, the rotating holding element runs from the rotary bearing to the rotating line portion, in particular the remote end of the rotating bend, in the internal region. This enables that the rotation of the rotating holding element having the rotating line portion can be relatively unrestricted, in particular continuous, in particular in comparison to a disposal of the bearing point and/or of the center of the circle that is not according to the invention, i.e. outside the rotating bend and the mast bend along the rotation axis or the internal region, respectively, in particular in an extension of the rotation axis, and/or when routing the rotating holding element in a manner not according to the invention from the rotary bearing to the rotating line portion not inside the internal region, or outside the internal region respectively, as a result of which the rotation of the rotating holding element having the rotating line portion may be relatively restricted. In particular, a pivot point, in particular a central pivot point, of the rotatable connection between the rotating line portion having the mast line portion and the bearing point and/or the center of the circle can coincide with one another or be congruent, respectively.

In a refinement of the invention, the device has a rotary coupling which is different from the rotating holding element and the rotary bearing. The rotary coupling rotatably connects the rotating line portion to the mast line portion. In particular, the rotary coupling can have, in particular be, a tube coupling. Additionally or alternatively, holding so as to be remote can mean that the rotating holding element can hold the rotating line portion so as to be remote from the rotary coupling. Furthermore additionally or alternatively, the rotating holding element can hold the rotating line portion on the rotary coupling.

In a refinement of the invention, the device has a hose coupling. The hose coupling is designed or configured, respectively, for connecting, in particular fluidically connecting, the rotating line portion to a, in particular the, hose, in particular an end hose. The rotating holding element holds the rotating line portion on the hose coupling.

Additionally or alternatively, the rotating line portion comprises the hose. The rotating holding element holds or supports, respectively, in particular in a rotationally fixed manner, the hose so as to be remote or spaced apart from, respectively, the mast line portion.

In particular, the hose coupling can have, in particular be, a sleeve coupling. Additionally or alternatively, the hose coupling can be remote from the mast line portion. Furthermore additionally or alternatively, the hose coupling can be different from the rotary coupling. Furthermore additionally or alternatively, the rotating line portion can be held on the rotating holding element by means of the hose coupling, however in particular not directly.

In a refinement of the invention, the line is a conveying line, in particular a construction material conveying line, in particular a thick matter conveying line. The line portion mounting enables that the conveying line, in particular when filled with construction material, in particular thick matter, can have a relatively great mass. In particular, construction material can include, or in particular be, sand, aggregate and/or gravel. Additionally or alternatively, thick matter can include, in particular be, mortar, cement, screed, concrete and/or plaster. Furthermore additionally or alternatively, thick matter can include, in particular be, a mixture of liquid and solid component parts.

In a refinement of the invention, the rotary bearing is a four-point bearing. This enables tilting moments and/or axial forces and/or radial forces, in particular in relation to the rotation axis, to be absorbed. A bearing element of the rotary bearing can in particular be a ball.

In a refinement of the invention, the line portion mounting has a rotary flange. The rotary flange is designed or configured, respectively, for mounting or supporting, respectively, in particular in a rotationally fixed manner, by the mast segment. Furthermore, the rotary flange comprises the rotary bearing. The line is routed or runs, respectively, through the rotary flange, in particular a feed-through, or an opening, respectively, of the rotary flange, in particular completely through the latter. In particular, the rotary flange can encompass, in particular enclose, the line.

The device can be configured for disposing the mast line portion and the rotating line portion on different, in particular mutually opposite, sides of the mast segment.

In a refinement of the invention, the device is designed or configured, respectively, for, in particular completely, disposing the mast line portion and the rotating line portion on a same side of the mast segment, in particular with the rotating line portion, in particular along the rotation axis, being more remote from the mast segment, in particular from the longitudinal axis of the mast segment than the mast line portion. This enables the use of the device as a tremie for a folding mast type 5RZ and/or for folding masts in the type of folding mechanisms of which relatively large angular ranges have to be traveled In a refinement of the invention, the device comprises the mast segment. The mast segment holds or supports, respectively, in particular in a rotationally fixed manner, the rotary bearing in particular and the mast line portion in particular, and is rotatably connected to the rotating holding element by means of the rotary bearing.

The distribution mast according to the invention, in particular the folding mast, has a, in particular the, device as described above, having the mast segment and further mast segments. In particular, the mast segment and the further mast segments are connected to one another so as to be able to be folded, in particular able to be folded in a rolling manner, in particular able to be folded in a rolling Z-shaped manner. The distribution mast can enable the same advantages as described above in the context of the device. In terms of the meaning of able to be folded in a rolling manner, in particular a rolling Z-shaped manner, reference is made to the relevant technical literature. Additionally or alternatively, able to be folded in a rolling manner can require that the mast line portion and the rotating line portion need to be or may be disposed on the same side of the mast segment.

The system according to the invention has a, in particular the, distribution mast as has been described above, and a construction material pump, in particular a thick matter pump. The construction material pump is designed or configured, respectively, for conveying construction material, in particular thick matter, through the line. The system can enable the same advantages as described above in the context of the device. The system can in particular be a mobile system, in particular an auto concrete pump. Additionally or alternatively, construction material can include, in particular be, sand, aggregate and/or gravel. Furthermore additionally or alternatively, thick matter can include, in particular be, mortar, cement, screed, concrete and/or plaster. Furthermore additionally or alternatively, thick matter can include, in particular be, a mixture of liquid and solid component parts.

BRIEF DESCRIPTION OF THE DRAWINGS

Further advantages and aspects of the invention are derived from the claims and from the description hereunder of preferred exemplary embodiments of the invention which are explained hereunder by means of the figures in which:

FIG. 5 shows a perspective view of a device according to an embodiment of the invention of the distribution mast of FIG. 2;

FIG. 6 shows a further perspective view of the device of FIG. 5;

FIG. 7 shows yet a further perspective view of the device of FIG. 5;

DETAILED DESCRIPTION OF THE EXEMPLARY EMBODIMENTS

Figure 1:
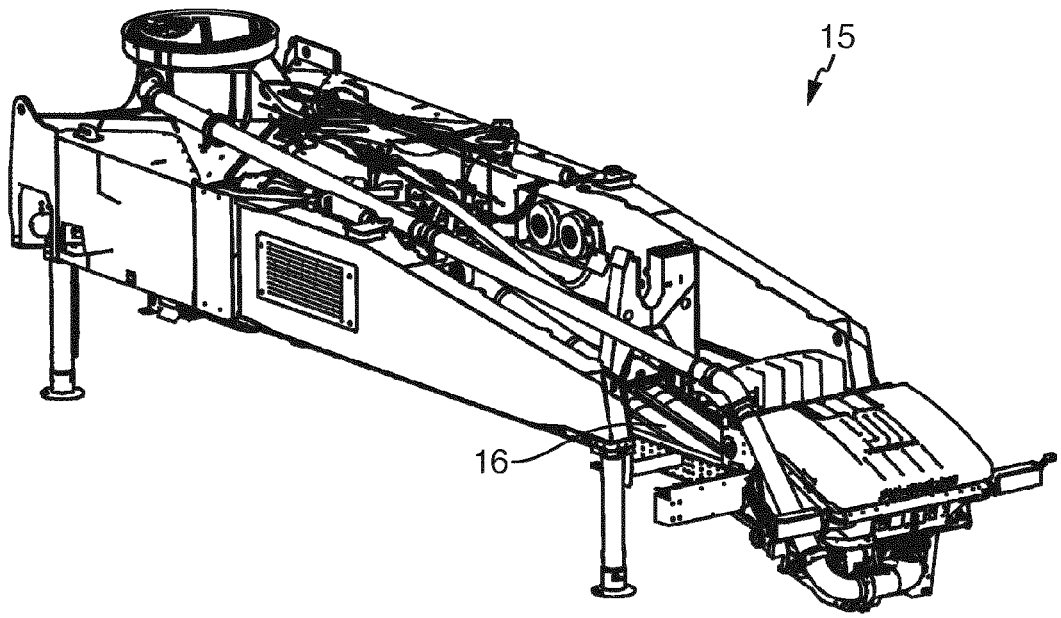
FIG. 1 shows a perspective view of a lower part, or of a construction material pump, respectively, of a system according to an embodiment of the invention.
Figure 2:
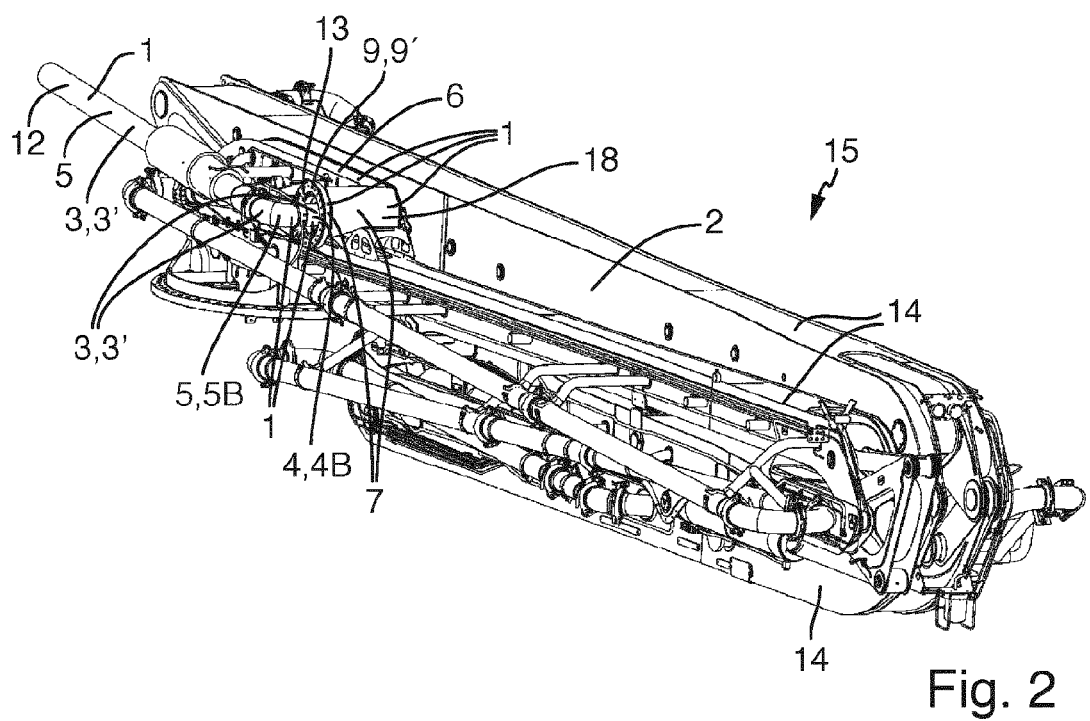
FIG. 2 shows a perspective view of an upper part, or of a distribution mast, respectively, of the system of FIG. 1.
Figure 3:
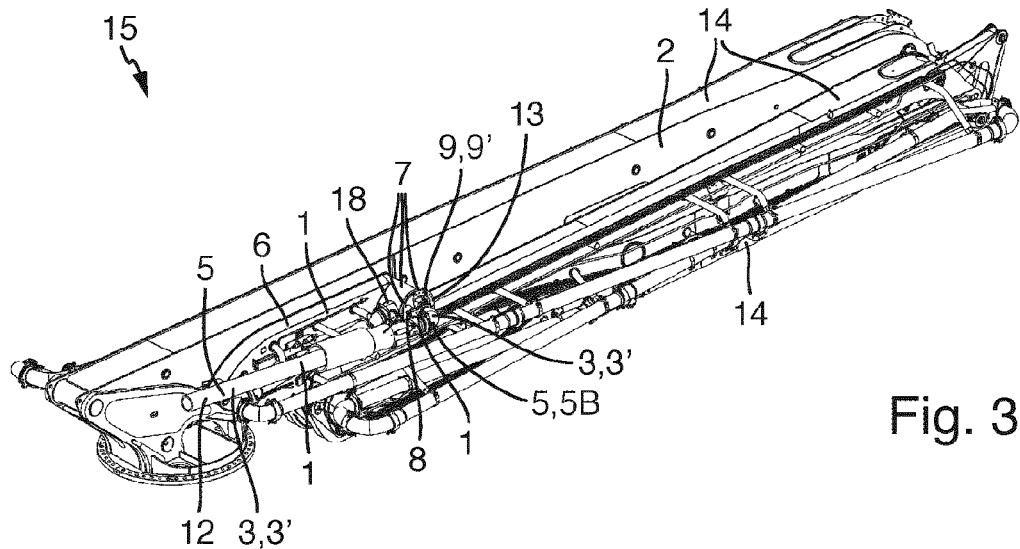
FIG. 3 shows a further perspective view of the distribution mast of FIG. 2.
Figure 4:
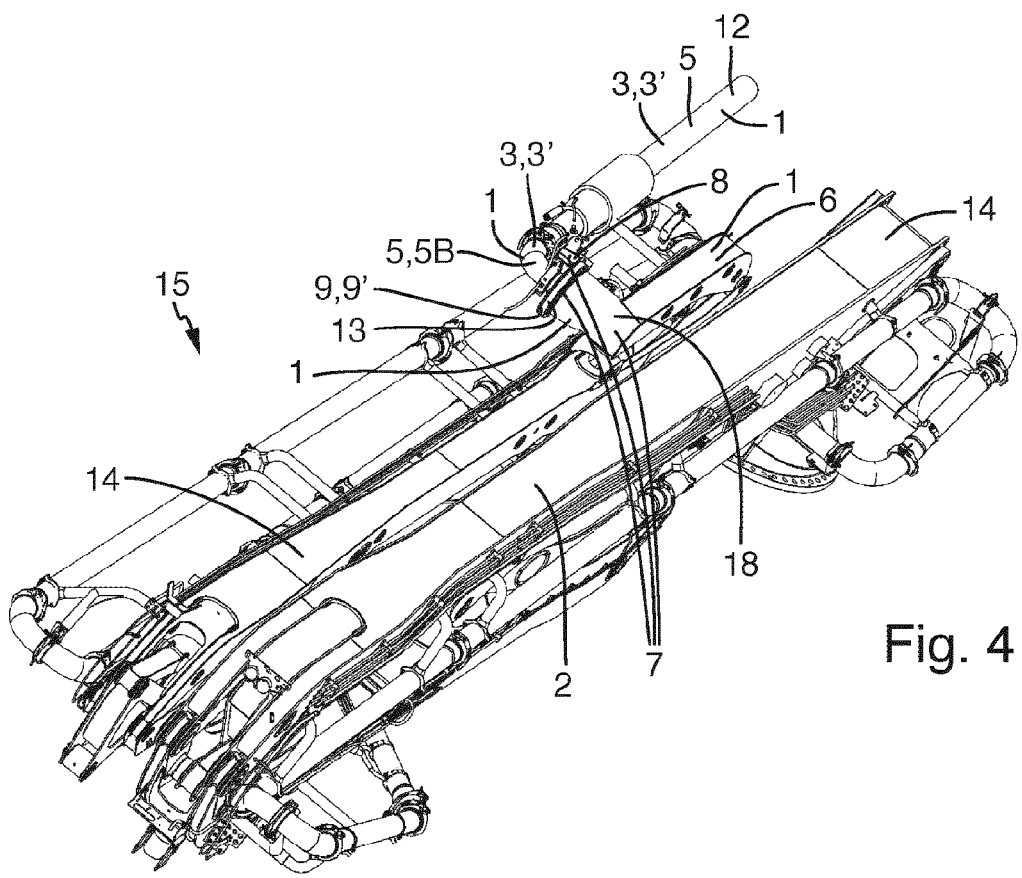
FIG. 4 shows yet a further perspective view of the distribution mast of FIG. 2.
Figure 8:
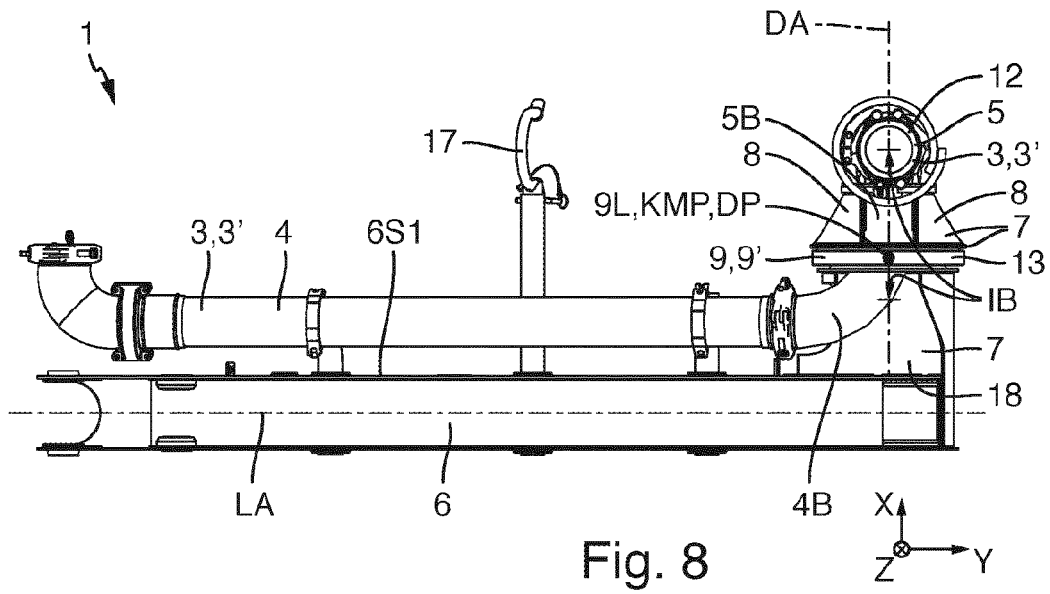
FIG. 8 shows yet a further perspective view of the device of FIG. 5.

FIGS. 2 to 8 and 9 show, in particular in each case, a device 1 for a distribution mast 2, the latter in the exemplary embodiment of FIGS. 2 to 8 being a folding mast. The device 1 has a line 3 and a line portion mounting 7. The line 3 has a mast line portion 4 and a loose rotating line portion 5. The rotating line portion 5 is rotatably connected to the mast line portion 4. The line portion mounting 7 has a loose rotating holding element 8 and a rotary bearing 9. The rotating holding element 8 holds the rotating line portion 5 so as to be remote from the mast line portion 4. The rotary bearing 9 is configured for mounting by an, in particular last, mast segment 6 for the distribution mast 2. Furthermore, the rotary bearing 9 is configured for rotatably connecting the rotating holding element 8 to the mast segment 6. Moreover, the rotary bearing 9 defines a circle KR. The line 3 runs through the circle KR.

In the exemplary embodiments shown, the mast line portion 4 is configured for mounting by the mast segment 6.

Furthermore, in the exemplary embodiments shown, the rotary bearing 9, in particular a trajectory of the rotary bearing 9, has the shape of the, in particular closed, circle KR. In alternative exemplary embodiments, the rotary bearing, in particular the trajectory of the rotary bearing, can have the shape of an, in particular open, arc, wherein the arc can define the circle.

Moreover, in the exemplary embodiments shown, the device 1 has the mast segment 6. The mast segment 6 holds the rotary bearing 9 in particular, and the mast line portion 4 in particular, and is rotatably connected to the rotating holding element 8 by means of the rotary bearing 9.

The distribution mast 2 according to the invention, in the exemplary embodiment of FIGS. 2 to 8 being the folding mast, has the device 1, the latter in particular having the mast segment 6, and further mast segments 14.

In the exemplary embodiment of FIGS. 2 to 8, the mast segment 6 and the further mast segments 14 are connected to one another so as to be able to be folded, in particular able to be folded in a rolling manner, in particular in a rolling Z-shaped manner.

The system 1 has the distribution mast 2 and a construction material pump 16, the latter in FIG. 1 being a thick matter pump. The construction material pump 16 is configured for conveying construction material, in particular thick matter, through the line 3.

Specifically, the line 3 is a conveying line, in particular a construction material conveying line, in particular a thick matter conveying line.

Furthermore, the rotating line portion 5 is connected to the mast line portion 4 so as to be rotatable about a rotation axis DA.

In the exemplary embodiments shown, the rotation axis DA is disposed so as to be horizontal, in particular in the direction x.

Additionally, the device 1 for disposing the rotation axis DA is configured so as not to be parallel, in particular so as to be orthogonal, to a longitudinal axis LA, in particular in the direction y, of the mast segment 6.

In the exemplary embodiments shown, the rotation axis DA is disposed so as not to be parallel, in particular so as to be orthogonal, to the longitudinal axis LA of the mast segment 6.

Furthermore additionally, the rotary bearing 9 is configured to be connected to the mast segment 6 so as to be rotatable about the rotation axis DA of the rotating holding element 8.

In the exemplary embodiments shown, the rotating holding element 8 is connected to the mast segment 6 so as to be rotatable about the rotation axis DA by means of the rotary bearing 9.

Moreover, the mast line portion 4 has a mast bend 4B. The mast bend 4B is rotatably connected to the rotating line portion 5. Moreover, the mast bend 4B runs through the circle KR.

Furthermore additionally, the rotating line portion 5 has a rotating bend 5B. The rotating bend 5B is rotatably connected to the mast line portion 4, the latter in the exemplary embodiment of FIGS. 2 to 8 being the mast bend 4B. Additionally, the rotating bend 5B runs through the circle KR. Furthermore additionally, the rotating holding element 8 holds the rotating line portion 5 on an end 5BE of the rotating bend 5B that is remote from the mast line portion 4, in particular from the mast bend 4B.

In the exemplary embodiments shown, the mast bend 4B and the rotating bend 5B are in each case a 90 degree bend and a tubular bend.

Specifically, the rotating bend 5B is connected to the mast bend 4B so as to be rotatable about the rotation axis DA. The rotating bend 5B and the mast bend 4B along the rotation axis DA delimit an internal region IB. A bearing point 9L of the rotary bearing, or a circle center KMP of the circle KR, respectively, is disposed in the internal region IB, in the exemplary embodiments shown on the rotation axis DA. Additionally, the rotating holding element 8 runs from the rotary bearing 9 to the rotating line portion 5, in the exemplary embodiments shown the remote end 5BE of the rotating bend 5BE, in the internal region IB.

In the exemplary embodiments shown, a pivot point DP of the rotatable connection between the rotating line portion 5, in the exemplary embodiment of FIGS. 2 to 8 of the rotating bend 5B, and the mast line portion 4, in the exemplary embodiment of FIGS. 2 to 8 the mast bend 4B, coincides with the bearing point 9L, or the circle center KMP.

Moreover, the device 1 has a rotary coupling 10 which is different from the rotating holding element 8 and the rotary bearing 9. The rotary coupling 10 rotatably connects the rotating line portion 5, in the exemplary embodiments shown the rotating bend 5B, to the mast line portion 4, in the exemplary embodiment of FIGS. 2 to 8 the mast bend 4B.

In the exemplary embodiments shown, the rotary coupling 10 is a tube coupling.

Furthermore, the device 1 has a hose coupling 11. The hose coupling 11 is configured for connecting the rotating line portion 5, in the exemplary embodiments shown the rotating bend 5B, to a hose 12, in particular an end hose. The rotating holding element holds the rotating line portion on the hose coupling.

In the exemplary embodiments shown, the hose coupling 11 connects the rotating line portion 5 to the hose 12.

Additionally, the rotating line portion 5 comprises the hose 12. The rotating holding element 8 holds the hose 12 so as to be remote from the mast line portion 4.

In the exemplary embodiments shown, the hose coupling 11 is a sleeve coupling.

The rotatable connection between the rotating line portion 5 and the mast line portion 4 and the rotatable connection between the rotating holding element 8 and the mast segment 6 by means of the rotary bearing 9 enable that the rotating holding element 8 having the rotating line portion 5, in particular the hose 12, is able to self-align, in particular by virtue of gravitation.

The rotating holding element 8 having the rotating line portion 5, in particular the hose 12, can thus rotate vertically downward counter to a direction z, as is shown in FIGS. 6 to 9.

Moreover, the part of the mast line portion 5, or the hose 12, respectively, that succeeds the rotating bend 5B can run along the mast segment 6, in particular so as to be parallel to the longitudinal axis LA, as is shown in FIGS. 2 to 5.

In particular, the device 1 has a hose bearing unit 17. The mast segment 6 holds the hose bearing unit 17. The hose 12 can bear on the hose bearing unit 17, as is shown in FIGS. 2 to 5.

Furthermore, a part of the mast line portion 4, in particular a straight tubular part, that precedes the mast bend 4B can run along the mast segment 6, in particular so as to be parallel to the longitudinal axis LA.

The rotary bearing 9 is moreover a four-point bearing 9'.

Furthermore, the line portion mounting 7 has a rotary flange 13. The rotary flange 13 is configured for mounting by the mast segment 6. Moreover, the rotary flange 13 comprises the rotary bearing 9. The line 3 runs through the rotary flange 13.

In the exemplary embodiments shown, the mast segment holds the rotary flange 13.

Furthermore, the line portion mounting 7 has a mast holding element 18. The mast holding element 18 is configured for mounting by the mast segment 6. Moreover, the mast holding element 18 holds the rotary bearing 9, in particular the rotary flange 13 comprising the rotary bearing 9.

In the exemplary embodiments shown, the mast segment 6 holds the mast holding element 18.

In summary, the mast segment 6 holds the mast line portion 4 and the mast holding element 18. The holding element 18 holds the rotary flange 13. The rotary flange 13 comprises the rotary bearing 9, or holds the latter, respectively. The rotary bearing 9 holds the rotating holding element 8. The rotating holding element 8 holds the hose coupling 11. The hose coupling 11 holds the rotating line portion 5, in particular the rotating tube bend 5B and the hose 12.

Moreover, the rotating line portion 5, the latter in the exemplary embodiments shown being the rotating bend 5B, is connected in a continuously rotating manner to the mast line portion 4, the latter in the exemplary embodiment shown being the mast bend 4B. The rotary bearing 9 is configured for connecting in a continuously rotatable manner the rotating holding element 8 to the mast segment 6. The device 1 is configured in such a manner that, when the rotary bearing 9 in particular and the mast line portion 4 are mounted by the mast segment 6, a continuous rotation of the rotating holding element 8 having the rotating line portion 5, in particular the rotating bend 5B and the hose 12, is unrestricted by the mast segment 6 and the mast line portion 4 in particular and the remaining line portion mounting 7, the latter in the exemplary embodiments shown comprising the rotary bearing 9 and the mast holding element 18.

In the exemplary embodiments shown, the rotating holding element 8 is connected in a continuously rotatable manner to the mast segment 6.

Furthermore, the device 1 is configured for disposing the rotatable connection between the rotating line portion 5, in the exemplary embodiments shown the rotating bend 5B, and the mast line portion 4, in the exemplary embodiments shown the mast bend 4, and the rotatable connection of the line portion mounting 7 on an, in particular loose, end of the mast segment 6.

In the exemplary embodiments shown, the rotatable connection between the rotating line portion 5 and the mast line portion 4 is disposed on the end of the mast segment 6, and the rotatable connection of the line portion mounting 7 is disposed on the end of the mast segment 6.

In the exemplary embodiment of FIGS. 2 to 8, the device 1 is configured for disposing the mast line portion 4 and the rotating line portion 5 on a same side 6S1 of the mast segment 6, in particular with the rotating line portion 5, in particular along the rotation axis DA, being more remote from the mast segment 6, in particular from the longitudinal axis LA of the mast segment 6, than the mast line portion 4.

In particular, the mast line portion 4 and the rotating line portion 5 are disposed on the same side 6S1 of the mast segment 6.

In alternative exemplary embodiments, the device can be configured for disposing the mast line portion and the rotating line portion on a same side of the mast segment with the mast line portion, in particular along the rotation axis, being more remote from the mast segment, in particular from the longitudinal axis of the mast segment than the rotating line portion.

Specifically, in the exemplary embodiment of FIGS. 2 to 8, the mast holding element 18 from the mast segment 6 runs along the rotation axis DA, in particular in the direction x, to the rotary bearing 9, in particular the rotary flange 13 comprising the rotary bearing 9.

Figure 9:
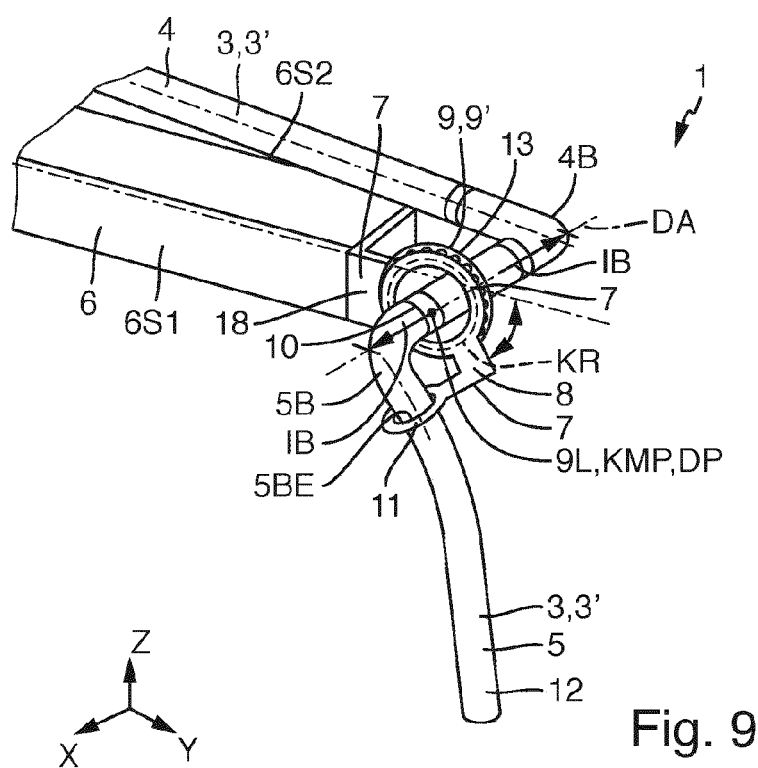
FIG. 9 shows a perspective view of a further device according to an embodiment of the invention.

In the exemplary embodiment of FIG. 9, the device 1 is configured for disposing the mast line portion 4 and the rotating line portion 5 on different sides 6S1, 6S2 of the mast segment 6, said sides 6S1 and 6S2 in particular being mutually opposite along the rotation axis DA.

In particular, the mast line portion 4 and the rotating line portion 5 are disposed on the different sides 6S1, 6S2 of the mast segment 6.

Specifically, in the exemplary embodiment of FIG. 9, the mast holding element 18 from the mast segment 6 runs in the extension of the longitudinal axis LA of the mast segment 6, in particular in the direction y, to the rotary bearing 9, in particular the rotary flange 13 comprising the rotary bearing 9.

As is highlighted by the exemplary embodiments shown and explained above, the invention provides an advantageous device for a distribution mast, wherein the device has improved properties, a distribution mast having such a device, and a system having such a distribution mast.

The invention claimed is:

1. A device for a distribution mast, comprising:
a line having a mast line portion and a loose rotating line portion, the rotating line portion being rotatably connected to the mast line portion; and
a line portion mounting having a loose rotating holding element and a rotary bearing, wherein:
the rotating holding element holds the rotating line portion se as to be remote from the mast line portion,
the rotary bearing is configured to be mounted by a mast segment of the distribution mast and for rotatably connecting the rotating holding element to the mast segment and defines a circle, wherein the line runs through the circle,
the rotating line portion is connected in a continuously rotating manner to the mast line portion,
the rotary bearing is configured for connecting the rotating holding element to the mast segment in a continuously rotating manner, and
the device is configured in such a manner that, when the rotary bearing is mounted by the mast segment, a continuous rotation of the rotating holding element having the rotating line portion is unrestricted by the mast segment and the mast line portion.

2. The device according to claim 1,
wherein the rotating line portion is connected to the mast line portion so as to be rotatable about a rotation axis, and
wherein the device for disposing the rotation axis is configured so as not to be parallel to a longitudinal axis of the mast segment.

3. The device according to claim 1,
wherein the rotating line portion is connected to the mast line portion so as to be rotatable about a rotation axis, and
wherein the rotary bearing is configured for connecting to the mast segment so as to be rotatable about the rotation axis of the rotating holding element.

4. The device according to claim 1, wherein at least one of:
(i) the mast line portion has a mast bend, the mast bend being rotatably connected to the rotating line portion and/or running through the circle; or
(ii) the rotating line portion has a rotating bend, the rotating bend being rotatably connected to the mast line portion, and/or running through the circle, and/or the rotating holding element holds the rotating line portion on an end of the rotating bend that is remote from the mast line portion.

5. The device according to claim 4,
wherein the rotating bend is connected to the mast bend so as to be rotatable about a rotation axis,
wherein the rotating bend and the mast bend along the rotation axis delimit an internal region; and
wherein at least one of: (i) a bearing point of the rotary bearing and/or a circle center point of the circle are/is disposed in the internal region, or (ii) the rotating holding element runs from the rotary bearing to the rotating line portion in the internal region.

6. The device according to claim 1, further comprising:
a hose coupling, wherein the hose coupling is configured for connecting the rotating line portion to a hose and wherein the rotating holding element holds the rotating line portion on the hose coupling; and/or
wherein the rotating line portion comprises the hose, wherein the rotating holding element holds the hose remote from the mast line portion.

7. The device according to claim 1,
wherein the line is a conveying line.

8. The device according to claim 1,
wherein the line is a construction material conveying line.

9. The device according to claim 1,
wherein the line is a thick matter conveying line.

10. The device according to claim 1,
wherein the rotary bearing is a four-point bearing.

11. The device according to claim 1,
wherein the line portion mounting has a rotary flange,
wherein the rotary flange is configured to be mounted by the mast segment and comprises the rotary bearing, and
wherein the line runs through the rotary flange.

12. The device according to claim 1,
wherein the device is configured for disposing the mast line portion and the rotating line portion on a same side of the mast segment, with the rotating line portion being more remote from the mast segment than the mast line portion.

13. The device according to claim 1, further comprising:
the mast segment, wherein the mast segment holds the rotary bearing.

14. A distribution mast, comprising:
a device according to claim 13; and
further mast segments;
wherein the mast segment and the further mast segments are connected to one another so as to be able to be folded.

15. The distribution mast according to claim 14, wherein the mast segment and the further mast segments are foldable in a rolling Z-shaped manner.

16. A system, comprising:
a distribution mast according to claim 14; and
a construction material pump, wherein the construction material pump is configured for conveying construction material through the line.

17. The system according to claim 16, wherein the construction material pump is a thick matter pump.

18. A device for a distribution mast, comprising:
a line having a mast line portion and a loose rotating line portion, the rotating line portion being rotatably connected to the mast line portion;
a line portion mounting having a loose rotating holding element and a rotary bearing,
a rotary coupling which is different from the rotating holding element and the rotary bearing, wherein the rotating holding element holds the rotating line portion remote from the mast line portion,
the rotary bearing is configured to be mounted by a mast segment of the distribution mast and for rotatably connecting the rotating holding element to the mast segment and defines a circle, wherein the line runs through the circle,
the rotary coupling rotatably connects the rotating line portion to the mast line portion, and the rotary coupling is coaxial with the rotary bearing.

* * * * *